US012608857B2

(12) United States Patent
Bekman

(10) Patent No.: US 12,608,857 B2
(45) Date of Patent: Apr. 21, 2026

(54) CONTROLLING HALLUCINATIONS IN GENERATED IMAGES

(71) Applicant: eBay Inc., San Jose, CA (US)

(72) Inventor: Denis Bekman, Kirkland, WA (US)

(73) Assignee: eBay Inc., San Jose, CA (US)

( * ) Notice: Subject to any disclaimer, the term of this patent is extended or adjusted under 35 U.S.C. 154(b) by 183 days.

(21) Appl. No.: 18/422,504

(22) Filed: Jan. 25, 2024

(65) Prior Publication Data

US 2025/0245882 A1     Jul. 31, 2025

(51) Int. Cl.

| | |
|---|---|
| *G09G 5/00* | (2006.01) |
| *G06T 7/12* | (2017.01) |
| *G06T 7/13* | (2017.01) |
| *G06T 11/60* | (2006.01) |
| *G06V 10/56* | (2022.01) |
| *G06V 10/764* | (2022.01) |
| *H04N 5/272* | (2006.01) |

(52) U.S. Cl.
CPC ............... *G06T 11/60* (2013.01); *G06T 7/12* (2017.01); *G06T 7/13* (2017.01); *G06V 10/56* (2022.01); *G06V 10/764* (2022.01); *H04N 5/272* (2013.01)

(58) Field of Classification Search
CPC ................. G09G 5/14; G09G 2340/10; G09G 2340/125; G06T 11/60; G06T 15/503; G06T 2207/30196; G06T 2207/10016; G06T 7/13; G06T 7/50; G06T 2200/24; G06T 2207/10024; G06T 2207/20221; G06T 11/203; G06T 11/00; G06T 1/60; G06T 7/248; G06T 7/74; G06T 5/50;

G06T 7/12; G06F 3/017; G06F 40/20; G06F 40/40; G06V 20/56; G06V 30/1423; G06V 10/764; G06V 10/56; H04N 23/69; H04N 23/60; H04N 21/8545; H04N 5/272; G02B 27/001; G02B 2027/0138; G02B 2027/014; B25J 9/1689; B25J 9/1697
USPC ......................................................... 345/629
See application file for complete search history.

(56) References Cited

U.S. PATENT DOCUMENTS

| | | | | |
|---|---|---|---|---|
| 10,248,883 B2 * | 4/2019 | Borovinskih | ........... | G06T 17/00 |
| 2020/0234451 A1 * | 7/2020 | Holzer | .................... | G06T 7/194 |
| 2020/0320777 A1 * | 10/2020 | Meshry | ................. | G06N 3/045 |
| 2024/0169501 A1 * | 5/2024 | Liu | ........................... | G06T 5/60 |

* cited by examiner

*Primary Examiner* — Gordon G Liu
(74) *Attorney, Agent, or Firm* — FIG. 1 Patents

(57) ABSTRACT

In accordance with techniques for controlling hallucinations in generated images, a generative image model receives an input image depicting an object and having a first background, and the generative image model produces a generated image depicting the object by replacing the first background with a second background. Further, a salient object detection model generates a first object mask and a second object mask. The first object mask defines a first positioning of the object within the input image, while the second object mask defines a second positioning of the object within the generated image. A hallucination metric capturing an amount of deformation introduced into the object by the generative image model is determined based on a comparison of the first object mask and the second object mask. In one or more implementations, the generated image is output based on the hallucination metric meeting a threshold.

20 Claims, 12 Drawing Sheets

100

200

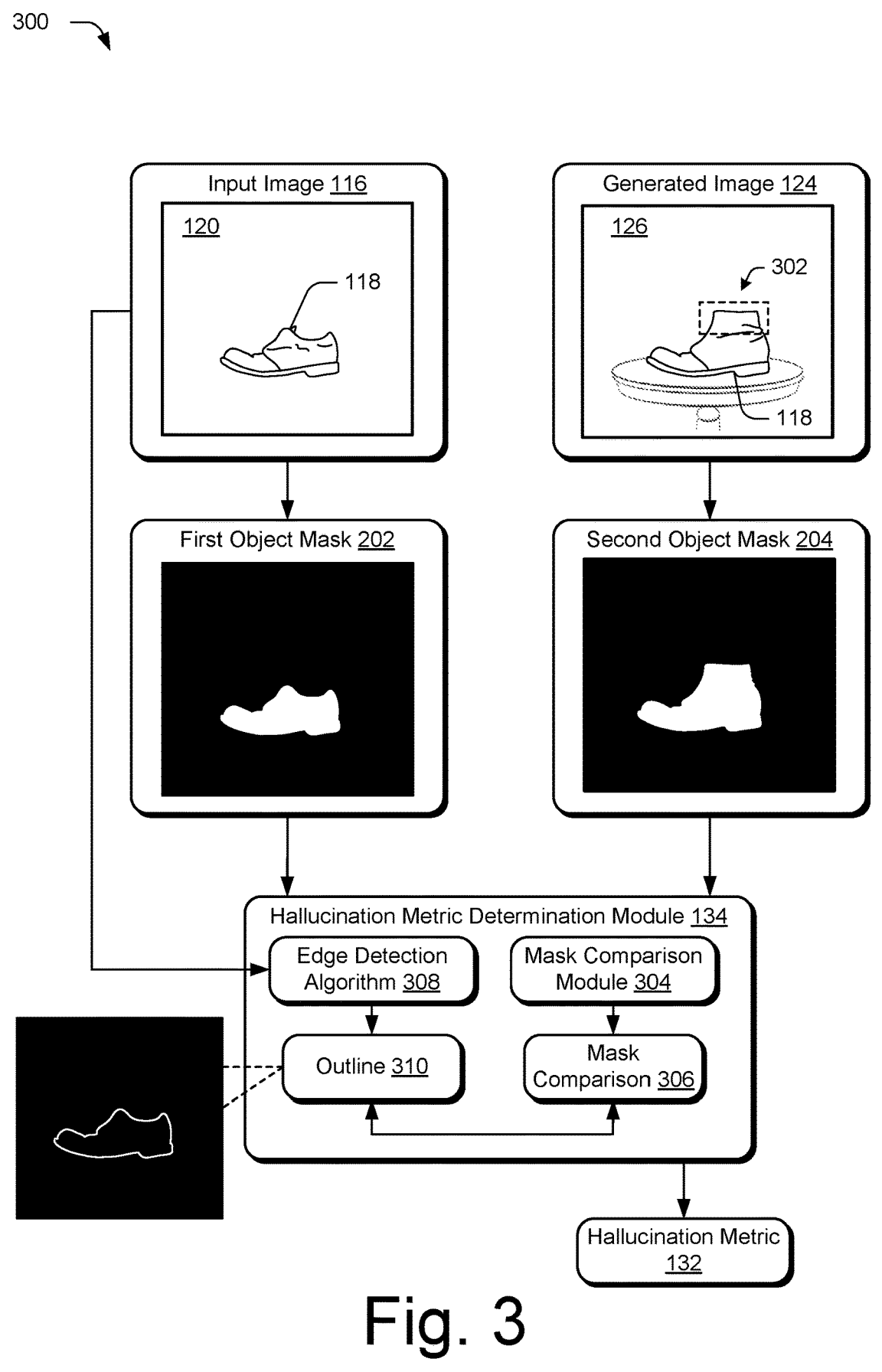

300

Input Image 116

120

118

Generated Image 124

126

302

118

First Object Mask 202

Second Object Mask 204

Hallucination Metric Determination Module 134

Edge Detection Algorithm 308

Mask Comparison Module 304

Outline 310

Mask Comparison 306

Hallucination Metric 132

Fig. 3

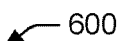

Testing Pair 608

Input Images 116

Background Generation Prompt 122

Training Module 602

Generative Image Model 128

Model Testing Module 604

Background Generation Module 112

Generative Image Model 128

Improvement Determination Module 612

Hallucination Metrics 132

Baseline Hallucination Metrics 610

Degree of Improvement 614

Improvement Threshold 616

Predefined Interval 606

Output 622

Generative Image Model 128

End Training 624

Improvement Threshold Met

Improvement Threshold Not Met

Output 618

Continue Training 620

Fig. 6

700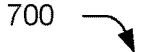
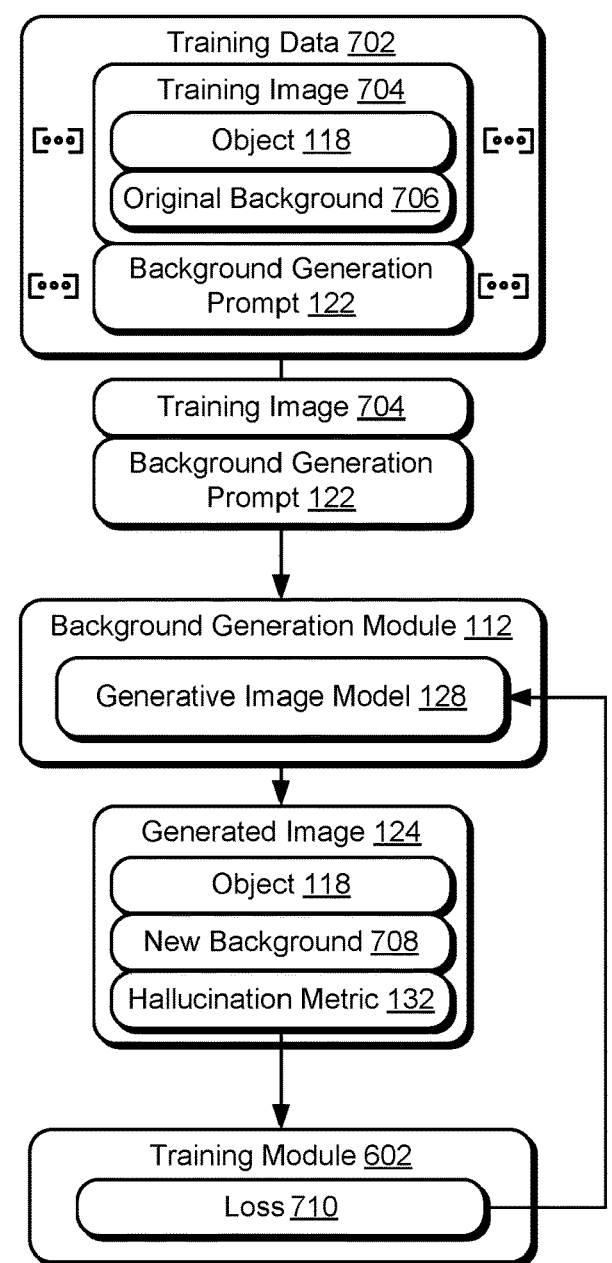
Fig. 7

800

Model Training

802

Generative Image Model

804

Improvement Threshold

75%

806

Begin Training

810

Progress

812

End Training

15% Improvement

Client Device 104

Training Initiation
Instruction 808

Service Provider System 102

Training Module 602

Generative Image Model 128

Model Testing Module 604

Degree of Improvement 614

900

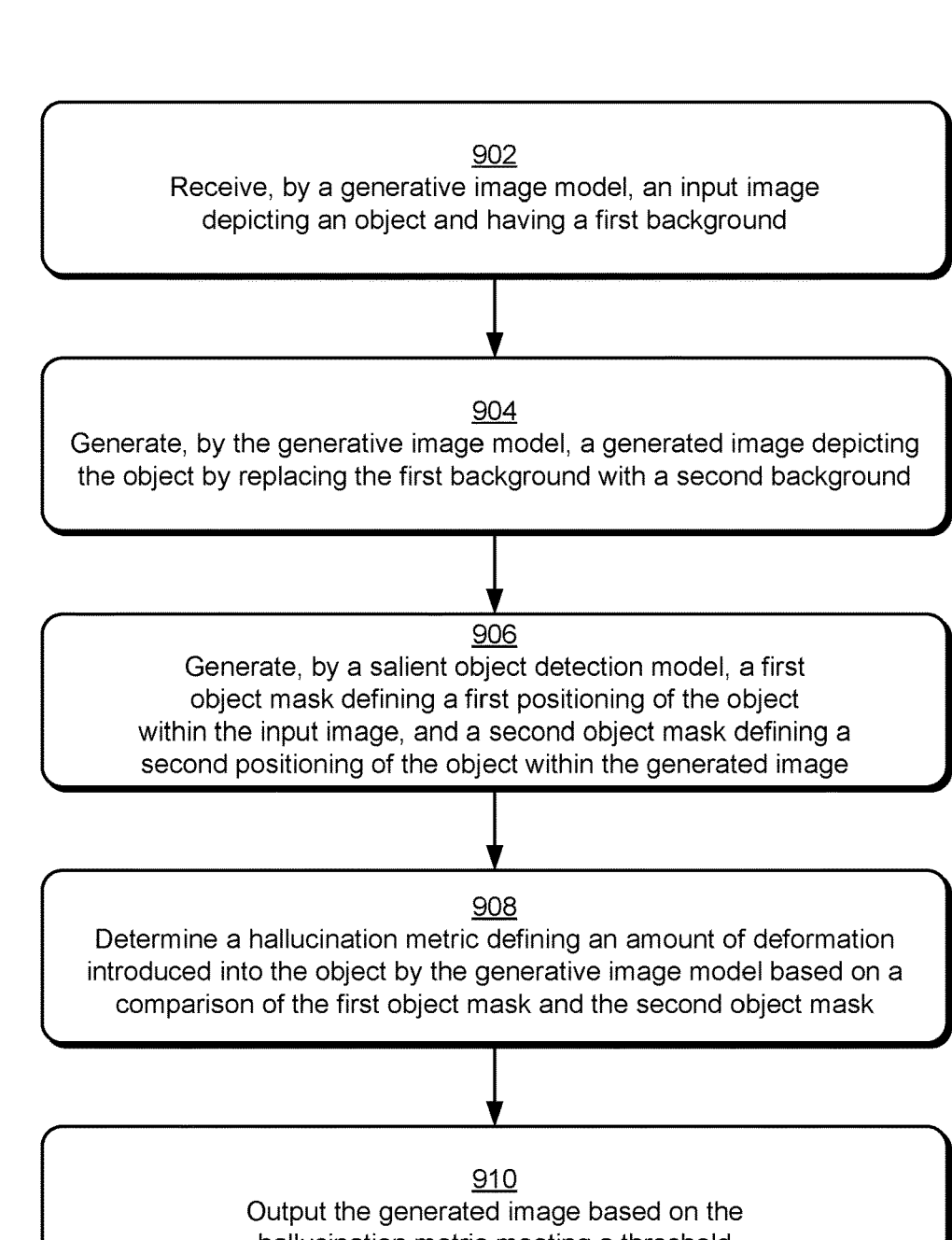

902
Receive, by a generative image model, an input image depicting an object and having a first background 904
Generate, by the generative image model, a generated image depicting the object by replacing the first background with a second background 906
Generate, by a salient object detection model, a first object mask defining a first positioning of the object within the input image, and a second object mask defining a second positioning of the object within the generated image 908
Determine a hallucination metric defining an amount of deformation introduced into the object by the generative image model based on a comparison of the first object mask and the second object mask 910
Output the generated image based on the hallucination metric meeting a threshold

Fig. 9

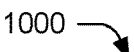

1000

1002
Receive, by multiple generative image models, an image set including multiple input images depicting objects and having first backgrounds

1004
Generate, by each of the multiple generative image models, a generated image set including multiple generated images depicting the objects by replacing the first backgrounds with second backgrounds

1006
Generate pairs of object masks using a salient object detection model, each pair of object masks including a first object mask of an object within an input image and a second object mask of the object within a corresponding generated image

1008
Determine, for each pair of object masks associated with each of the multiple generative image models, a hallucination metric based on a comparison of the first object mask and the second object mask

1010
Select a particular generative image model for replacing backgrounds of subsequently received images based on hallucination metrics determined for the pairs of object masks associated with the multiple generative image models

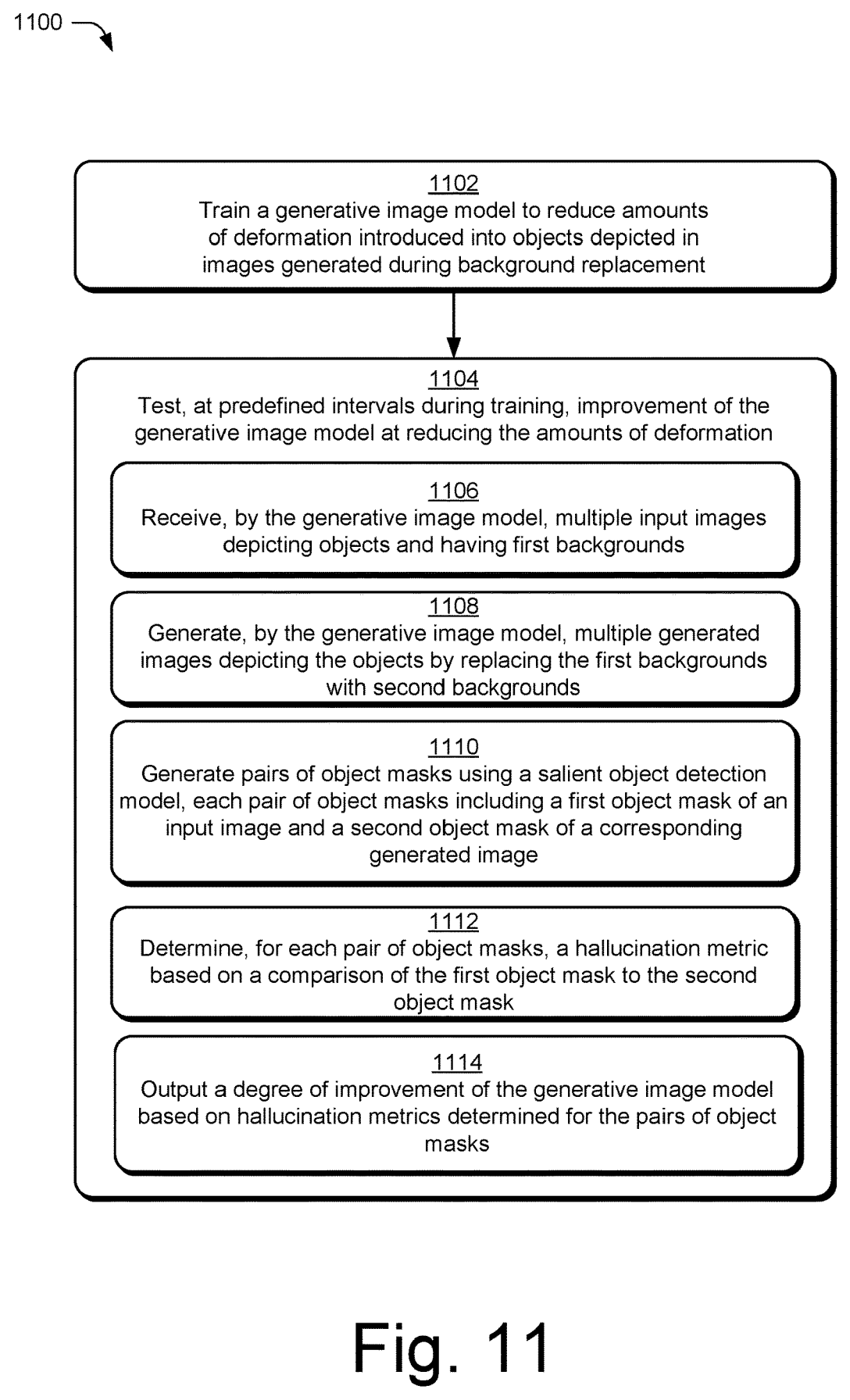

1102
Train a generative image model to reduce amounts of deformation introduced into objects depicted in images generated during background replacement

1104
Test, at predefined intervals during training, improvement of the generative image model at reducing the amounts of deformation

1106
Receive, by the generative image model, multiple input images depicting objects and having first backgrounds

1108
Generate, by the generative image model, multiple generated images depicting the objects by replacing the first backgrounds with second backgrounds

1110
Generate pairs of object masks using a salient object detection model, each pair of object masks including a first object mask of an input image and a second object mask of a corresponding generated image

1112
Determine, for each pair of object masks, a hallucination metric based on a comparison of the first object mask to the second object mask

1114
Output a degree of improvement of the generative image model based on hallucination metrics determined for the pairs of object masks

Fig. 11

1200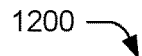
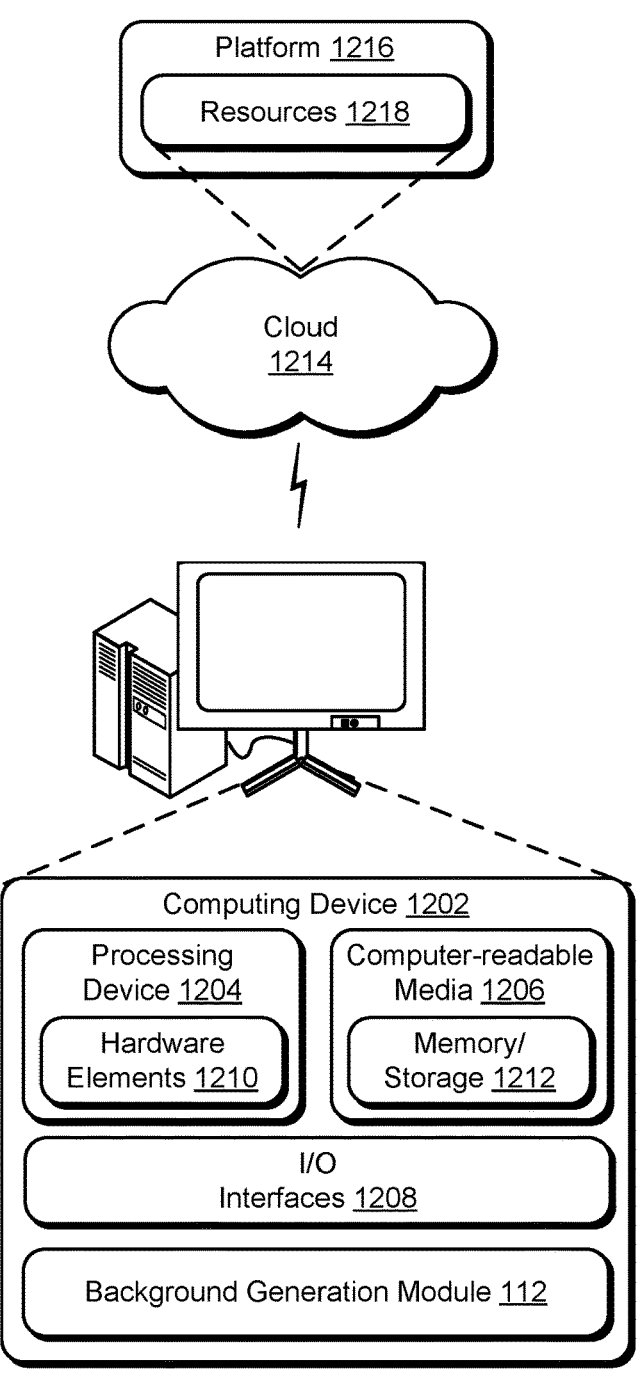
Fig. 12

CONTROLLING HALLUCINATIONS IN GENERATED IMAGES

BACKGROUND

Machine learning refers to techniques implemented by computing devices to make predictions or decisions based on data without being explicitly programmed to do so, e.g., by a user. To "learn" how to make such predictions or decisions, machine learning models are trained using training data. A machine learning model refers to a computer representation that can be tuned (e.g., trained and retrained) based on inputs to approximate unknown functions. In particular, a machine learning model utilizes algorithms to learn from, and make predictions on, known data by analyzing training data to learn and relearn to generate outputs that reflect patterns and attributes of the training data. A generative image model is a machine learning model that has been trained to generate images based on text inputs and/or image inputs. Generative image models can be leveraged for the task of background replacement, e.g., transferring an object depicted in an original image to a new image with a background generated by the generative image model.

SUMMARY

Techniques for controlling hallucinations in generated images are described. In accordance with the described techniques, a generative image model receives an input image depicting an object and having a first background, and produces a generated image depicting the object by replacing the first background with a second background. Further, a salient object detection model generates a first object mask and a second object mask. The first object mask defines a first positioning of the object within the input image, while the second object mask defines a second positioning of the object within the generated image. A hallucination metric capturing an amount of deformation introduced into the object by the generative image model is determined based on a comparison of the first object mask and the second object mask.

In one or more implementations, output of the generated image is controlled based on whether the hallucination metric associated with the generated image meets a threshold. Additionally or alternatively, hallucination metrics determined for generated images produced by different generative image models are used to evaluate performance of the different generative image models with respect to reducing deformation introduced into objects of the generated images. Additionally or alternatively, hallucination metrics determined for generated images produced by a generative image model at predefined intervals during a training process are used to test improvement of the generative image model in reducing deformation introduced into objects of the generated images during model training.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

FIG. 3 depicts a system in an example implementation showing operation of a hallucination metric determination module to determine a hallucination metric for a generated image.

FIG. 6 depicts a system in an example implementation showing operation of a background generation module to test improvement of a generative image model at reducing hallucinations in generated images periodically during training.

FIG. 7 depicts a system in an example implementation showing operation of a training module to refine a generative image model to reduce hallucinations in generated images.

FIG. 9 is a flow diagram depicting a procedure in an example implementation to control output of generated images based on a hallucination metric.

FIG. 10 is a flow diagram depicting a procedure in an example implementation to select a generative image model for replacing backgrounds of subsequently received images.

FIG. 11 is a flow diagram depicting a procedure in an example implementation to test improvement of a generative image model at reducing hallucinations in generated images periodically during training.

FIG. 12 illustrates an example system including various components of an example device that can be implemented as any type of computing device as described and/or utilized with reference to FIGS. 1-11 to implement embodiments of the techniques described herein.

DETAILED DESCRIPTION

Overview

Figure 1:
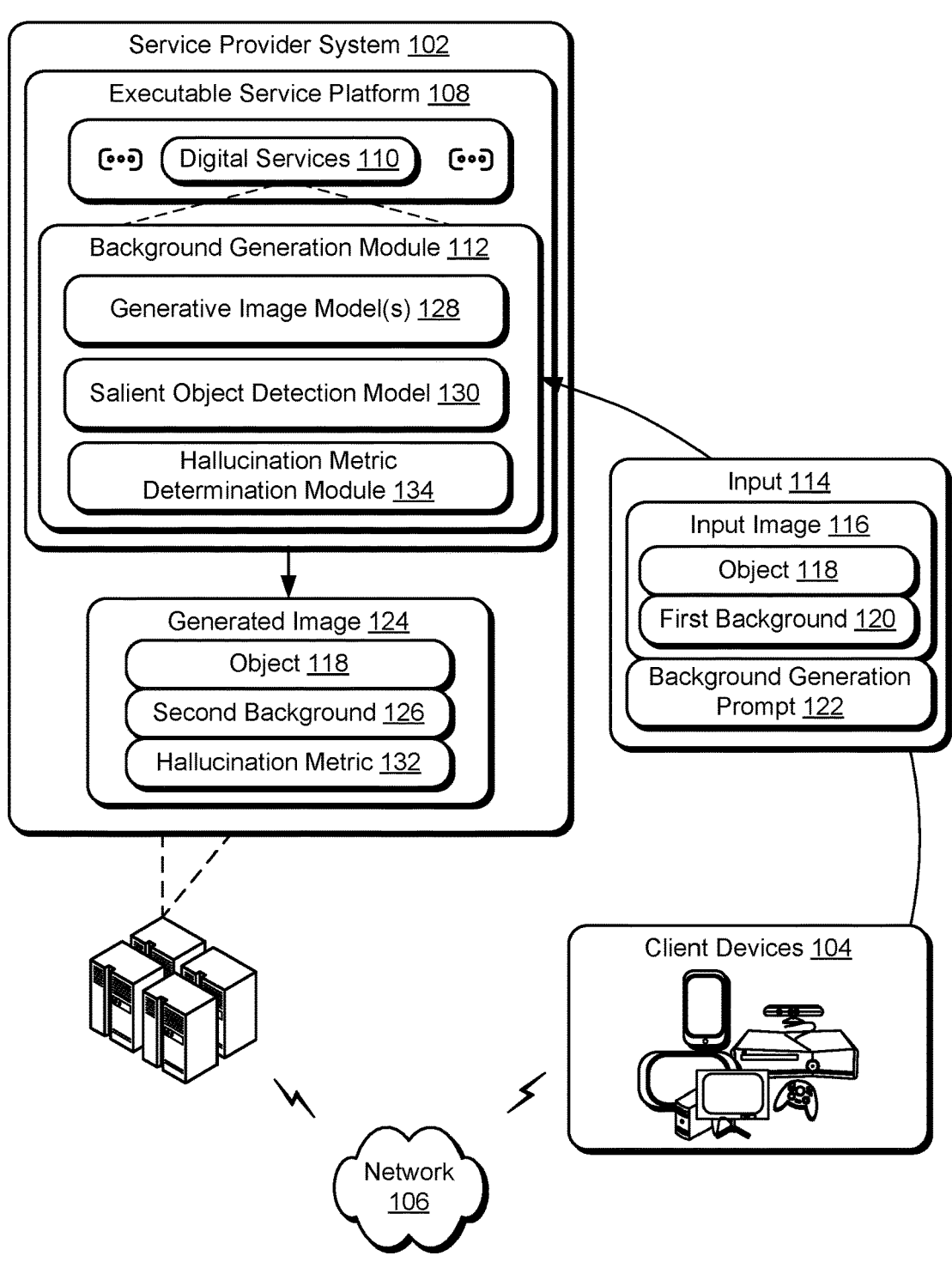
FIG. 1 is an illustration of a digital medium environment in an example implementation that is operable to employ techniques for controlling hallucinations in generated images.

Generative image models are machine learning models that have been trained to generate images based on text inputs and/or image inputs. In one or more scenarios, generative image models are leveraged for the task of background replacement. For example, a generative image model receives an original image depicting an object and having a first background, and the generative image model produces a generated image depicting the same object and having a second background. However, generative image models leveraged for background replacement often introduce hallucinations into the object of the generated image. In general, hallucinations are a phenomenon that occur when a generative image model perceives patterns and/or objects in the input image which are non-existent or imperceptible to human observers. Further, the imperceptible or non-existent patterns and/or objects are attributed by the generative image model as being part of the object depicted in the input image. As a result, the generative image model often introduces visual content (e.g., hallucinations) into the object depicted in the generated image that is not present in the object depicted in the input image. In other words, hallucinations cause the object depicted in the generated image to differ from the object depicted in the input image.

Conventional techniques for evaluating hallucinations in generated images rely on human perception. For example, a conventional hallucination evaluation technique relies on human users to classify a generated image as accurately representing or misrepresenting a corresponding input image from which the generated image is generated. Manually classifying generated images in this manner is time-consuming, and produces inconsistently classified images, e.g., due to the subjective nature of what qualifies as an accurate representation or a misrepresentation of an object. For at least these reasons, conventional hallucination evaluation techniques are unable to feasibly and/or efficiently perform a variety of downstream processes, such as controlling output of generated images based on degrees of hallucination present in the generated images, evaluating multiple different generative image models with respect to hallucination reduction, and testing improvement of a generative image model at hallucination reduction during model training.

Accordingly, techniques for controlling hallucinations in generated images are described which overcome the drawbacks of conventional techniques. In accordance with these techniques, a background generation module is employed by a service provider system, and the service provider system is communicatively coupled (e.g., via a network) to one or more client devices. Broadly, the background generation module determines a hallucination metric, which quantifies the amount of deformation (e.g., hallucinations) introduced into an object of a generated image by a generative image model. In a first portion of the following discussion, an example process is described for determining a hallucination metric for a generated image. In a second portion of the following discussion, examples are described for leveraging the hallucination metric for performing the aforementioned downstream processes.

In order to determine a hallucination metric for a generated image, a generative image model of the background generation module receives a background generation (e.g., text) prompt, and an input image depicting an object having a first background. As output, the generative image model produces a generated image depicting the object and having a second background that corresponds with the background generation prompt.

The background generation module further includes a salient object detection model, which is a machine learning model that is trained to highlight salient or prominent object(s) in an image. Here, the salient object detection model receives the input image and the generated image, generates a first object mask based on the input image, and generates a second object mask based on the generated image. The first object mask, for instance, is a binary mask defining a first positioning of the object within the input image, while second object mask is a binary mask defining a second positioning of the object within the generated image.

The first object mask and the second object mask are provided to a hallucination metric determination module of the background generation module. The hallucination metric determination module is configured to determine a hallucination metric based on a comparison of the first object mask and the second object mask. To do so, the hallucination metric determination module determines a symmetric difference between the first object mask and the second object mask. The symmetric difference defines a first number of pixels including pixels of the first object mask that are absent from the second object mask, and pixels of the second object mask that are absent from the first object mask.

In addition, the hallucination metric determination module employs an edge detection algorithm to generate an outline of the object as depicted in the input image. The outline, for instance, is a constant width line (e.g., a one-pixel-wide line, a two-pixel-wide line, a three-pixel-wide line, etc.) along the perimeter of the object as depicted in the input image. Here, the hallucination metric determination module determines, as the hallucination metric, a ratio of the first number of pixels in the symmetric difference to a second number of pixels in the outline of the object. Therefore, the hallucination metric captures a number of hallucinated pixels in the generated image per outline pixel of the object in the input image. By normalizing the hallucination metric to the outline of the object in the input image, the hallucination metric is proportional to the size and shape of the object.

In one example downstream process, the background generation module is leveraged for controlling output of generated images based on the hallucination metric. For instance, the background generation module receives a background generation prompt and an input image depicting an object and having a first background. Here, the generative image model repeatedly produces generated images depicting the object by replacing the first background with a second background until a generated image is produced having a hallucination metric that meets a hallucination threshold. The background generation module communicates only the generated image that meets the hallucination threshold to the client device for presentation, e.g., without communicating generated images that fall below the hallucination threshold.

In another example downstream process, the background generation module is leveraged for evaluating multiple generative image models with respect to hallucination reduction based on the hallucination metric. By way of example, the background generation module receives an image set having multiple input images depicting objects and having first backgrounds. Here, multiple different generative image models produce a generated image set having multiple generated images depicting the objects by replacing the first backgrounds with second backgrounds. In accordance with the described techniques, hallucination metrics are determined for each generated image within each of the generated image sets produced by the different generative image models. Further, the hallucination metrics associated with the different generative image models are compared. A particular generative image model exhibiting the lowest degree of hallucination (e.g., having the lowest hallucination scores) is selected for background replacement of subsequently received images. For example, an image is received after the multi-model evaluation process is performed, and the particular generative image model is selected to produce a generated image by replacing a background of the image with a generated background.

In another example downstream process, the background generation module is leveraged to test improvement of a generative image model, in terms of hallucination reduction, during training based on the hallucination metrics. By way of example, the background generation module trains a generative image model to reduce amounts of deformation introduced into objects depicted in images generated during background replacement. In one or more implementations, the hallucination metrics are used in an algorithm for training a generative image model. The algorithm includes, for instance, associating a larger loss with generated images where there is more hallucination of an object (e.g., having a higher hallucination metric), associating a lesser loss with generated images where there is less hallucination of an object (e.g., having a lower hallucination metric), and iteratively updating parameters of the generative image model to reduce the loss.

At predefined intervals during the training process, testing pairs (e.g., each including an input image depicting an object and a background generation prompt) are provided to the generative image model. Here, the generative image model produces generated images based on the testing pairs by replacing the backgrounds of the input images with new backgrounds. Further, hallucination metrics are determined for the generated images in accordance with the described techniques, and are compared to baseline hallucination metrics. The baseline hallucination metrics, for instance, are hallucination metrics determined for images generated from the testing pairs by the generative image model prior to the training process having begun. Further, the background generation prompt outputs a degree of improvement of the generative image model based on the comparison.

The described techniques thus enable automatic assignment of hallucination metrics to generated images, e.g., without human intervention apart from providing an input image and a background generation prompt. In contrast to conventional manual hallucination evaluation techniques, therefore, the described techniques enable scoring of a multitude of generated images in a relatively short period of time, e.g., thousands of generated images in a matter of seconds. Moreover, the described techniques do so using a hallucination metric that is consistently quantifiable based on, for example, a ratio of the number of pixels in the symmetric difference of the object masks to a number of pixels in the outline of the object as depicted in the input image. This also contrasts with conventional manual hallucination evaluation techniques, which rely on unquantified human determinations (e.g. whether a generated image accurately represents or misrepresents an object) that vary from person to person. Accordingly, the described techniques enable performance of the aforementioned downstream processes based on the hallucination metric with increased efficiency and consistency, as compared to conventional techniques In the following discussion, an example environment is described that employs the techniques described herein. Example procedures are also described that are performable in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ techniques for controlling hallucinations in generated images. The illustrated environment 100 includes a service provider system 102, and a plurality of client devices 104 that are communicatively coupled, one to another, via a network 106. Computing devices that implement the service provider system 102 and the client devices 104 are configurable in a variety of ways.

A computing device, for instance, is configurable as a desktop computer, a laptop computer, a mobile device (e.g., assuming a handheld configuration such as a tablet or mobile phone), and so forth. Thus, a computing device ranges from full resource devices with substantial memory and processor resources (e.g., personal computers, game consoles) to a low-resource device with limited memory and/or processing resources (e.g., mobile devices). Additionally, a computing device is also representative of a plurality of different devices, such as multiple servers utilized by a business to perform operations "over the cloud" as illustrated for the service provider system 102 and as described in FIG. 12.

The service provider system 102 includes an executable service platform 108. The executable service platform 108 is configured to implement and manage access to digital services 110 "in the cloud" that are accessible by the client devices 104 via the network 106. Thus, the executable service platform 108 provides an underlying infrastructure to manage execution of digital services 110, e.g., through control of underlying computational resources.

The executable service platform 108 supports numerous computational and technical advantages, including an ability of the service provider system 102 to readily scale resources to address wants of an entity associated with the client devices 104. Thus, instead of incurring an expense of purchasing and maintaining proprietary computer equipment for performing certain computational tasks, cloud computing provides the client devices 104 with access to a wide range of hardware and software resources so long as the client has access to the network 106.

Digital services 110 can take a variety of forms. Examples of digital services include social media services, document management services, storage services, media streaming services, online publication services, content creation services, productivity services, digital marketplace services, auction services, and so forth. In some instances, the digital services 110 are implemented at least partially by a background generation module 112 that supports functionality for generating images using background replacement techniques.

By way of example, the client devices 104 include functionality to send communications, such as an input 114, to the service provider system 102 over the network 106. As shown, background generation module 112 of the service provider system 102 receives the input 114 from the client device 104, and the input 114 includes an input image 116 depicting an object 118 and having a first background 120. The input 114 also includes a background generation prompt 122 (e.g., text) describing a new background into which the depicted object 118 is to be integrated. As output, the background generation module 112 produces a generated image 124 depicting the object 118 by replacing the first background 120 with a second background 126 that corresponds to the background generation prompt 122.

In various examples, the background generation module 112 enables users of the client devices 104 to generate images for integration into a product listing of the digital marketplace services and/or the auction services, into an online publication of the online publication services (e.g., as a thumbnail image for a content item, such as a video, blog post, or article, posted to an online publication service), into a social media post of the social media services, and so on.

In other words, the background generation module 112 is implementable in conjunction with a plurality of different digital services 110 without departing from the spirit or scope of the described techniques.

In one or more implementations, the background generation module 112 implements one or more machine learning models, e.g., including generative image models 128, salient object detection models 130, and object classification models (not depicted). Notably, a machine learning model refers to a computer representation that can be tuned (e.g., trained and retrained) based on inputs to approximate unknown functions. The machine learning model is configurable to utilize algorithms to learn from, and make predictions on, known data by analyzing training data to learn and relearn to generate outputs that reflect patterns and attributes of the training data. Examples of machine learning models include transformers, neural networks (e.g., deep learning neural networks), convolutional neural networks (CNNs), long short-term memory (LSTM) neural networks, decision trees, and so forth.

As shown, the background generation module 112 leverages one or more generative image models 128, which are machine learning models that are pre-trained to generate images from text inputs and image inputs. Any one of a variety of public or proprietary pre-trained generative image models 128 are employable by the background generation module 112 without departing from the spirit or scope of the described techniques. Examples of the generative image models 128 include, but are not limited to, stable diffusion models, DALL-E, DALL-E 2, and DALL-E 3 models, Imagen models, Muse models, and Midjourney models. Broadly, a generative image model 128 is configured to receive the background generation prompt 122, as well as the input image 116 depicting the object 118 and having the first background 120. As output, the generative image model 128 generates a generated image 124 by replacing the first background 120 with the second background 126, e.g., such that the generated image 124 still depicts the object 118.

One problem frequently encountered by generative image models 128 leveraged for background replacement is the introduction of hallucinations into the object 118 of the generated image 124. In general, hallucinations are a phenomenon that occurs when a generative image model 128 perceives patterns and/or objects in the input image 116 which are non-existent or imperceptible to human observers. Further, the imperceptible or non-existent patterns and/or objects are attributed by the generative image model 128 as being part of the object 118 depicted in the input image 116. As a result, the generative image model 128 often introduces visual content (e.g., hallucinations) into the object 118 depicted in the generated image 124 that is not present in the object depicted in the input image 116. In other words, hallucinations cause the object 118 depicted in the generated image 124 to differ from the object 118 depicted in the input image 116. Hallucinations vary in degree—from minor deformations along the outline of the object 118 depicted in the generated image 124 to an entirely different object 118 depicted in the generated image 124.

In order to control hallucinations in generated images, the background generation module 112 is employed to determine a hallucination metric 132 that quantifies a degree of hallucination (e.g., an amount of deformation) introduced into the objects 118 depicted in the generated images 124. To do so, the background generation module 112 employs a salient object detection model 130, which is a machine learning model that is pre-trained to highlight salient or prominent object(s) in an image. Any one of a variety of public or proprietary pre-trained salient object detection models 130 are employable by the background generation module 112 without departing from the spirit or scope of the described techniques. Examples of the salient object detection model 130 include, but are not limited to, a DeepLab model, a Saliency U-Net model, a Pixel-wise Contextual Attention Network (PiCANet) model, and so on. Broadly, the salient object detection model 130 is configured to receive, as input, the input image 116 and the generated image 124. As output, the salient object detection model 130 generates a first object mask (e.g., a binary mask) defining a first positioning of the object 118 within the input image 116, and a second object mask (e.g., a binary mask) defining a second positioning of the object 118 within the generated image 124.

As shown, the background generation module 112 includes a hallucination metric determination module 134, which is configured to determine the hallucination metric 132 based on a comparison of the first object mask and the second object mask. Different techniques for determining the hallucination metric 132 are discussed below with reference to FIG. 3.

Conventional techniques for evaluating hallucinations in generated images rely on human perception. One example conventional technique, for instance, involves relying on human perception to classify generated images 124 as positive (e.g., accurately representing the object 118 in corresponding input images 116) or negative (e.g., misrepresenting the object 118 in corresponding input images 116). This is a time consuming and tedious process. Moreover, these conventional techniques produce inconsistent results because what qualifies as a "positive" sample of a generated image 124 or a "negative" sample of a generated image 124 varies greatly from person to person.

In contrast, the described techniques automatically (without human intervention apart from providing/specifying the input 114) score a multitude of generated images 124 in a relatively short period of time (e.g., thousands of generated images in a matter of seconds) using a quantifiable and consistent hallucination metric 132. Due to this, the described techniques increase feasibility and/or efficiency of a variety of downstream processes that leverage the hallucination metric 132, which are otherwise infeasible and/or inefficient using manual hallucination evaluation techniques.

In one example downstream process, as further discussed below with reference to FIG. 2, the background generation module 112 is configured to control output of a generated image 124 based on whether the hallucination metric 132 associated with the generated image 124 meets a threshold. In another example downstream process, as further discussed below with reference to FIG. 4, hallucination metrics 132 determined for generated images 124 produced by different generative image models 128 are used to evaluate performance of the different generative image models 128 with respect to hallucination reduction. In another example downstream process, as further discussed below with reference to FIG. 6, hallucination metrics 132 determined for generated images 124 produced by a generative image model 128 at predefined intervals during a training process are used to test improvement of the generative image model 128, in terms of hallucination reduction, during model training. In another example downstream process, hallucination metrics 132 determined for generated images 124 produced by a generative image model 128 are used as part of a supervised learning approach to refine the generative image model 128 to reduce hallucinations in generated images 124.

Although examples are depicted and described herein in which the background generation module 112 is implemented by the service provider system 102, these examples are not to be construed as limiting. Rather, the background generation module 112 (or an instance thereof) is implemented locally at the client device(s) 104 in variations. In accordance with these implementations, the described techniques (e.g., the determination of hallucination metrics 132 and the leveraging of the hallucination metrics 132 for the downstream processes) are performable entirely at the client device 104, e.g., without communicating data over the network 106 to the service provider system 102

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Hallucination Control Features

The following discussion describes techniques for controlling hallucinations in generated images that are implementable utilizing the previously described systems and devices. Aspects of each of the procedures are implemented in hardware, firmware, software, or a combination thereof. The procedures are shown as a set of blocks that specify operations performed by one or more devices and are not necessarily limited to the orders shown for performing the operations by the respective blocks.

Hallucination Metric-Driven Generated Image Output Control

Figure 2:
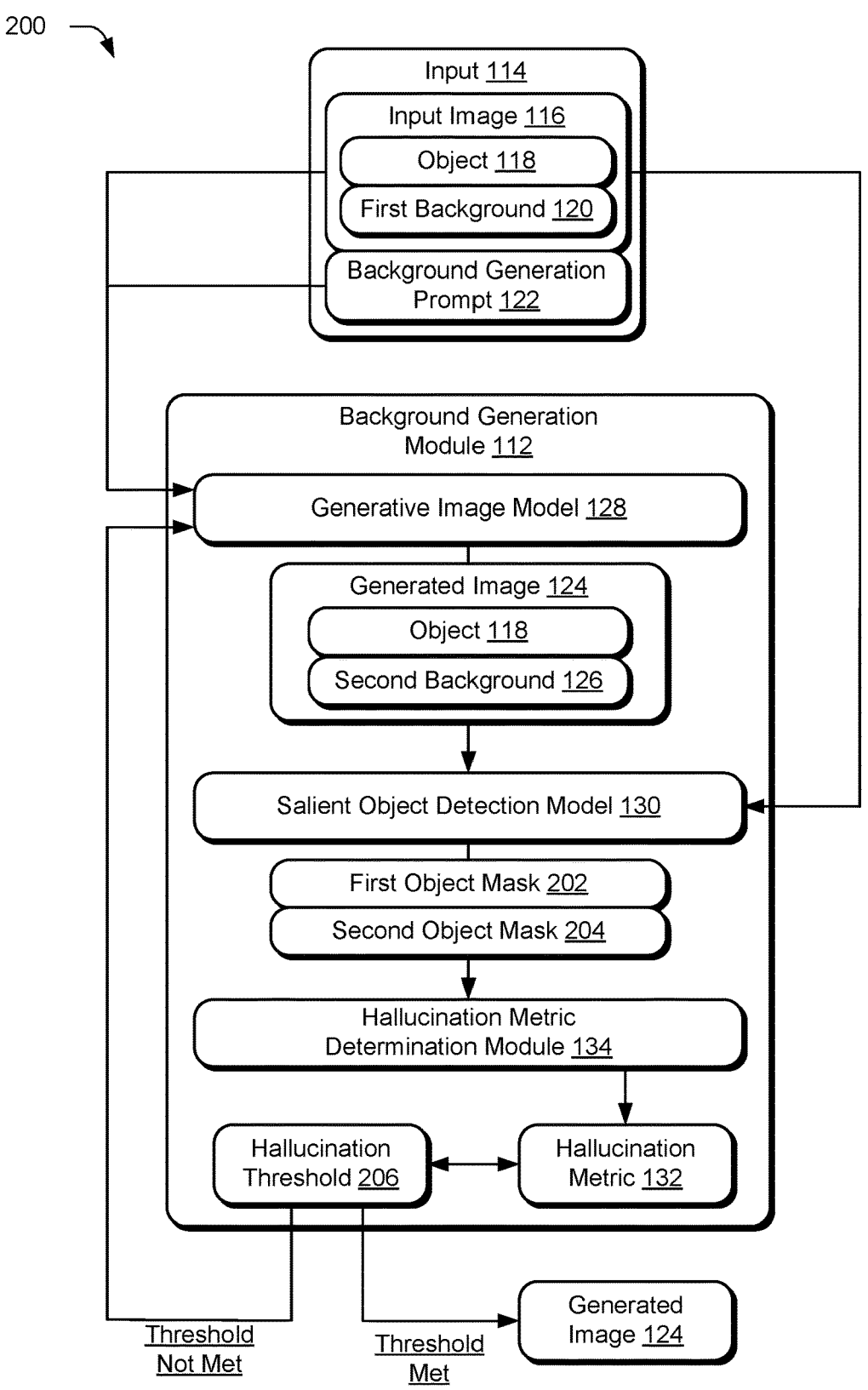
FIG. 2 depicts a system in an example implementation showing operation of a background generation module to control output of generated images based on a hallucination metric.

FIG. 2 depicts a system 200 in an example implementation showing operation of a background generation module to control output of generated images based on a hallucination metric. FIG. 3 depicts a system 300 in an example implementation showing operation of a hallucination metric determination module to determine a hallucination metric for a generated image. In the following discussion, reference will be made to FIGS. 2 and 3 in parallel with procedure 900 of FIG. 9.

Referring to FIG. 2, the background generation module 112 receives the input 114, e.g., from a client device 104 over the network 106. In particular, the generative image model 128 receives the input image 116 depicting the object 118 and having a first background 120 (block 902), as well as a background generation prompt 122. The background generation prompt 122, for instance, corresponds to text (input by a user of the client device 104) prompting the generative image model 128 to produce a generated image 124 depicting the object 118 and having a second background 126. In one or more implementations, the background generation prompt 122 describes the second background 126 into which the object 118 of the input image 116 is to be integrated.

As output, the generative image model 128 generates a generated image 124 depicting the object 118 by replacing the first background 120 with the second background 126 (block 904). In other words, the generated image 124 includes the object 118 of the input image 116, but the generated image 124 includes a different background. As shown in FIG. 3, for example, the input image 116 depicts a shoe (e.g., the object 118), and has a first background 120. An example background generation prompt 122 corresponding to the depicted example is "generate an image of these shoes placed on a table." As shown, the background generation model 128 generates a generated image 124 depicting the shoe (e.g., the object 118), and having a second background 126 corresponding to the background generation prompt 122 (e.g., with the shoe placed on a table).

Returning to FIG. 2, the input image 116 and the generated image 124 are provided as input to the salient object detection model 130. As shown, the salient object detection model generates a first object mask 202 defining a first positioning of the object 118 within the input image 116, and a second object mask 204 defining a second positioning of the object 118 within the generated image 124 (block 906). As shown in FIG. 3, for example, the first object mask 202 is a binary mask of the input image 116 which defines where, within the input image 116, the object 118 is positioned. Further, the second object mask 204 is a binary mask of the generated image 124 which defines where, within the generated image 124, the object 118 is positioned. In the illustrated example, the white pixels are pixels of the object masks 202, 204.

As illustrated at 302 of FIG. 3, however, the object 118 depicted in the generated image 124 includes visual content that is not present in the object 118 depicted in the input image 116. In other words, the generative image model has introduced deformations (e.g., hallucinations) along the outline of the object 118 (e.g., along the collar of the shoe). Due to this, the first object mask 202 and the second object mask 204 differ in size and shape.

Returning to FIG. 2, the first object mask 202 and the second object mask 204 are provided as input to the hallucination metric determination module 134, which determines a hallucination metric 132 capturing an amount of deformation introduced in the object 118 by the generative image model 128 based on a comparison of the first object mask 202 and the second object mask 204 (block 908). As shown in FIG. 3, for example, the hallucination metric determination module 134 includes a mask comparison module 304, which is configured to output a mask comparison 306 based on the first object mask 202 and the second object mask 204.

In one example, the mask comparison 306 corresponds to a symmetric difference between the first object mask 202 and the second object mask 204. The symmetric difference defines a number of pixels that includes pixels of the first object mask 202 that are absent from the second object mask 204 and pixels of the second object mask 204 that are absent from the first object mask 202. In other words, the symmetric difference includes pixels that are present in either the first object mask 202 or the second object mask 204, but excludes pixels that are present in both the first object mask 202 and the second object mask 204. Practically, the symmetric difference captures deformation introduced into the object 118 of the generated image 124 in the form of visual content added to the object 118 by the generative image model 128, as well as visual content removed from the object 118 by the generative image model 128.

In another example, the mask comparison 306 corresponds to a complement of the first object mask 202 with respect to the second object mask 204. The complement defines a number of pixels of the second object mask 204 that are absent from the first object mask 202. Practically, the complement captures deformation introduced into the object 118 of the generated image in the form of visual content added to the object 118 by the generative image model 128, but not visual content removed from the object 118 by the generative image model 128. The complement is a suitable measurement for the mask comparison 306 because many types of generative image models 128 (e.g., inpainting models) are specifically trained to preserve pixels of the object 118 during background replacement, and do so with success in an overwhelming majority of cases. Broadly, the complement and the symmetric difference capture a number of hallucinated pixels introduced into the object 118 of the generated image 124 by the generative image model 128.

In one or more implementations, the hallucination metric determination module 134 leverages an edge detection algorithm 308. Any one of a variety of public or proprietary edge detection algorithms 308 are employable by the hallucination metric determination module 134 without departing from the spirit or scope of the described techniques. Examples of the edge detection algorithm 308 include, but are not limited to, a Canny edge detector, a Sobel filter, a Euler filter, a Deriche edge detector, a Prewitt operator, and so on. In accordance with the described techniques, the edge detection algorithm 308 receives the input image 116 as input, and outputs an outline 310 of the object 118 as depicted in the input image 116. As shown, for example, the outline 310 is a binary mask that highlights pixels that are located along the perimeter of the object 118. In one or more examples, the outline 310 is a constant width line (e.g., a one-pixel-wide line, a two-pixel-wide line, a three-pixel-wide line, etc.) along the perimeter of the object 118.

In various implementations, the hallucination metric determination module 134 determines the hallucination metric 132 by comparing the mask comparison 306 to the outline 310. In one example, the hallucination metric 132 is a ratio of a number of pixels within the symmetric difference to a number of pixels within the outline 310. In another example, the hallucination metric 132 is a ratio of a number of pixels within the complement to a number of pixels within the outline 310. In these examples, the hallucination metric 132 captures a number of hallucinated pixels per outline pixel of the object 118 within the input image 116.

Notably, hallucinated pixels have a greater detrimental effect to the overall quality of the generated image 124 when the object 118 is smaller relative to the size of the input image 116. It is for this reason that the hallucination metric 132 is normalized to the outline 310 of the object 118. Consider an example in which a first generated image 124 depicts a first object 118 having a particular number of hallucinated pixels, and a second generated image 124 depicts a second object 118 having the same number of hallucinated pixels. In this example, the first object 118 is larger than the second object 118, and as such, the first generated image 124 appears to a human observer to be a higher quality generated image 124 (in terms of model-introduced hallucinations) as compared to the second generated image 124. This is reflected in the hallucination metrics 132. Indeed, the hallucination metric 132 of the first generated image 124 is lower than the hallucination score of the second generated image 124. This is because the hallu-cination metric 132 of the first generated image 124 is normalized to the greater number of pixels in the outline 310 of the larger object 118.

Although the hallucination metric 132 is depicted and described above as being determined by comparing the mask comparison 306 and the outline 310, it is to be appreciated that the hallucination metric 132 is determinable in other ways without departing from the spirit or scope of the described techniques. In one alternative approach, the hallucination metric determination module 134 determines the hallucination metric 132 by comparing the mask comparison 306 to the first object mask 202. For example, the hallucination metric 132 is a ratio of the number of pixels in the mask comparison 306 (e.g., the symmetric difference or the complement) to the number of pixels in the first object mask 202. By determining the hallucination metric 132 based on the first object mask 202, the hallucination metric 132 is normalized to the size of the object 118.

In another alternative approach, the hallucination metric determination module 134 determines, as the hallucination metric 132, an intersection over union between the first object mask 202 and the second object mask 204. To do so, the hallucination metric determination module 134 determines an intersection between the first object mask 202 and the second object mask 204, e.g., a number of pixels that are present in both the first object mask 202 and the second object mask 204. Further, the hallucination metric determination module 134 determines a union between the first object mask 202 and the second object mask 204, e.g., a number of pixels including pixels in the intersection, pixels of the first object mask 202 that are absent from the second object mask 204, and pixels of the second object mask 204 that are absent from the first object mask 202. The intersection over union is a ratio of the number of pixels in the intersection to the number of pixels in the union, and as such, is proportional to the size of the object 118.

In addition to shape-based hallucinations (in which the shape of the object 118 in the generated image 124 is deformed in comparison to the object 118 in the input image 116), various generative image models 128 potentially introduce color-based hallucinations into the object 118 of the generated image 124. By way of example, portions of the object 118 in the generated image 124 are different colors than corresponding portions of the object 118 in the input image 116.

Thus, in another alternative approach, the hallucination metric determination module 134 is configured to modify the hallucination metric 132 based on a degree of color-based hallucinations detected in the object 118 of the generated image 124. To detect the color-based hallucinations, the hallucination metric determination module 134 extracts a portion of the input image 116 corresponding to the first object mask 202, and extracts a portion of the generated image 124 corresponding to the second object mask 204. In other words, the hallucination metric determination module 134 extracts the object 118 as depicted in the input image 116 based on the first object mask 202, and extracts the object 118 as depicted in the generated image 124 based on the second object mask 204.

Further, the hallucination metric determination module 134 performs pixel-by-pixel comparisons of color values between the object 118 as depicted in the input image 116 and the object 118 as depicted in the generated image 124. For example, the hallucination metric determination module 134 identifies corresponding pixel pairs, such that each corresponding pixel pair includes a first pixel of the object 118 as depicted in the input image 116 and a second pixel of the object 118 as depicted in the generated image 124. Additionally, the first pixel and the second pixel are positioned at a same relative position in the input image 116 and the generated image 124, respectively.

To determine a degree of color-based hallucinations, the hallucination metric determination module 134 counts a number of the corresponding pixel pairs that have different color values. In one or more implementations, the degree of color-based hallucinations is a ratio of the number of corresponding pixel pairs having different color values to the number of pixels in the first object mask 202. To determine the hallucination metric 132, in this alternative approach, the hallucination metric determination module 134 combines (e.g., adds together) a degree of shape-based hallucinations to the degree of color-based hallucinations. In variations, the degree of shape-based hallucinations and the degree of color-based hallucinations are weighted differently to capture their relative importance to the overall quality of the generated image 124. Here, the degree of shape-based hallucinations corresponds to the ratio of the number of pixels in the mask comparison 306 to the number of pixels in the outline 310, the ratio of the number of pixels in the mask comparison 306 to the number of pixels in the first object mask 202, or the intersection over union between the first object mask 202 and second object mask 204.

Returning to FIG. 2, the background generation module 112 is configured to compare the hallucination metric 132 to a hallucination threshold 206. As shown, the background generation module 112 outputs the generated image 124 based on the hallucination metric 132 meeting the hallucination threshold 206 (block 910). For example, the background generation module 112 communicates the generated image 124 over the network 106 for presentation at the client device 104 based on the hallucination threshold 206 being met.

If, however, the hallucination metric 132 does not meet the hallucination threshold 206, the background generation module 112 instructs the generative image model 128 to produce a new generated image 124 depicting the object 118 and having a new background based on the input image 116 and the background generation prompt 122. The above-described process is repeated until the background generation module 112 produces a generated image 124 that is assigned a hallucination metric 132 that satisfies the hallucination threshold 206.

As previously mentioned, conventional techniques for evaluating hallucinations in generated images rely on human perception. Thus, in order to produce an acceptable generated image 124, a human user of a conventionally-configured system repeatedly prompts the generative image model 128 to produce generated images 124 until a generated image 124 with an acceptable amount of hallucination is generated. This requires repeated communications over the network 106 in order to display each generated image 124 at the client device 104. In contrast, the described techniques communicate, for display at the client device 104, only those generated images 124 having a hallucination metric 132 that meets the hallucination threshold 206. By doing so, the described techniques reduce consumption of communication bandwidth on the network 106.

Hallucination Metric-Driven Generative Image Model Selection

Figure 4:
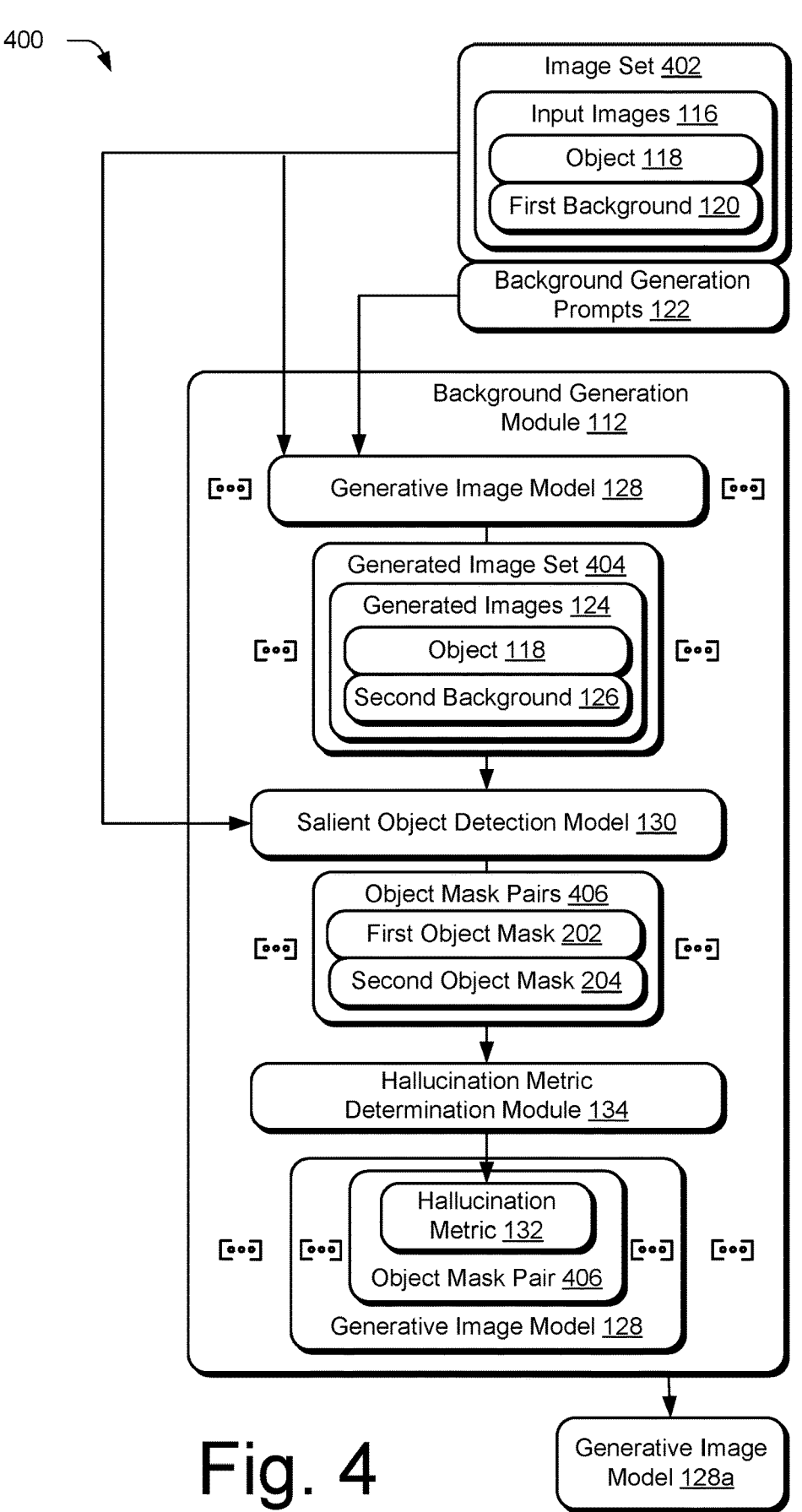
FIG. 4 depicts a system in an example implementation showing operation of a background generation module to select a generative image model for replacing backgrounds of subsequently received images.
Figure 5:
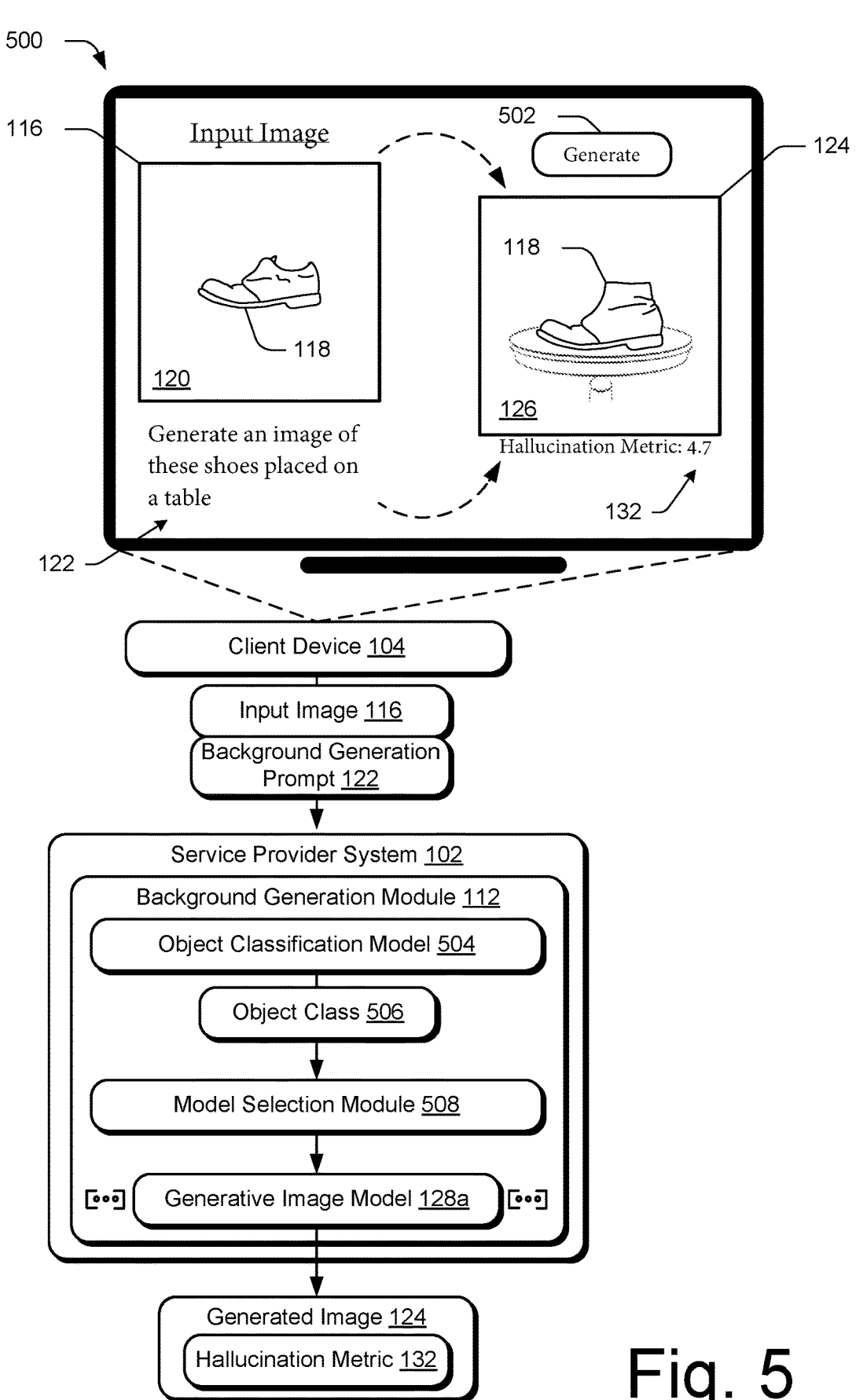
FIG. 5 depicts an example in which a client device leverages the background generation module to produce a generated image of an object by replacing a background of an input image with a new background.

FIG. 4 depicts a system 400 in an example implementation showing operation of a background generation module to select a generative image model for replacing backgrounds of subsequently received images. FIG. 5 depicts an example 500 in which a client device leverages the background generation module to produce a generated image of an object by replacing a background of an input image with a new background. In the following discussion, reference will be made to FIGS. 4 and 5 in parallel with procedure 1000 of FIG. 10.

Referring to FIG. 4, multiple generative image models 128 receive an image set 402 including multiple input images 116 depicting objects 118 and having first backgrounds 120 (block 1002), as well as a set of background generation prompts 122. For example, the multiple generative image models 128 are different ones of stable diffusion models, DALL-E models, DALL-E 2 models, DALL-E 3 models, Imagen models, Muse models, Midjourney models, and so on.

Each of the generative image models 128 are configured to generate a generated image set 404 including multiple generated images 124 depicting the objects 118 by replacing the first backgrounds 120 with second backgrounds 126 (block 1004). By way of example, the input images 116 are paired with the background generation prompts 122. For each input image 116 in the image set 402, a respective generative image model 128 produces a generated image 124 by replacing the first background 120 of the input image 116 with a new background based on the background generation prompt 122 paired therewith. This process is repeated by each of the generative image models 128. As a result, each respective generative image model 128 produces a generated image set 404 including generated images 124 generated by the respective generative image model 128 from the input images 116 in the image set 402. As shown, the image set 402 and the generated image sets 404 are provided as input to the salient object detection model 130.

As shown, the salient object detection model 130 generates object mask pairs 406, such that each object mask pair 406 includes a first object mask 202 of an object 118 within an input image 116 and a second object mask of the object 118 within a corresponding generated image 124 (block 1006). By way of example, the image set 402 and a respective generated image set 124 are organized into image pairs, each including a generated image 124 of the generated image set 404 and an input image 116 from which the generated image 124 was generated. For each image pair of the respective generated image set 404, the salient object detection model 130 generates a first object mask 202 from the input image 116 of the image pair, and also generates a second object mask 204 from the generated image 124 of the image pair in accordance with the described techniques. This process is repeated for each of the generated image sets 404, resulting in a plurality of object mask pairs 406 associated with each of the generative image models 128. As shown, the object mask pairs 406 are provided as input to the hallucination metric determination module 134.

In accordance with the described techniques, the hallucination metric determination module 134 determines a hallucination metric 132 for each object mask pair 406 associated with each of the multiple generative image models 128 based on a comparison of the first object mask 202 and the second object mask 204 (block 1008). For each object mask pair 406 associated with a respective generative image model 128, for instance, the hallucination metric determination module 134 determines a hallucination metric 132 in accordance with the described techniques. This process is repeated on the object mask pairs 406 associated with each of the generative image models 128. As a result, each respective generative image model 128 is associated with a plurality of hallucination metrics 132 as determined by comparing the first object masks 202 of the input images 116 to the second object masks 204 of corresponding generated images 124 that are generated by the respective generative image model 128.

In one or more implementations, the background generation module 112 selects a particular generative image model 128*a* for replacing backgrounds of subsequently received images based on hallucination metrics determined for the object mask pairs 406 associated with the multiple generative image models 128 (block 1010). By way of example, the background generation module 112 determines, for each respective generative image model 128, an average of the hallucination metrics 132 associated with the respective generative image model 128. Further, the background generation module 112 selects, as the particular generative image model 128*a* for use in replacing backgrounds of subsequently received images, the generative image model 128 having the lowest average hallucination metric 132.

In one or more implementations, the objects 118 depicted in the input images 116 of the image set 402 are objects 118 of a particular object class. For example, each of the input images 116 in the image set 402 depict shoes. Given this, the particular generative image model 128*a* has demonstrated increased reduction in hallucinations for objects 118 of the particular object class (e.g., shoes), as compared to the other generative image models 128. Accordingly, the background generation module 112 stores (e.g., in a database) an indication of the particular generative image model 128*a* associated with an indication that the particular generative image model 128*a* is to be leveraged for background replacement for input images 116 depicting objects of the particular class (e.g., shoes).

In various implementations, the generative image model 128 selection process is repeated using a plurality of different image sets 402 each depicting objects 118 of a different object class. In other words, the background generation module 112 evaluates performance of the generative image models 128 at reducing hallucinations in a plurality of different object classes. As a result, the database stores (e.g., in the database) a plurality of associations between different generative image models 128 and different object classes.

Additionally or alternatively, the objects 118 depicted in the input images 116 of the image set 402 are objects 118 of a plurality of different object classes. Given this, the particular generative image model 128*a* has demonstrated increased reduction in hallucinations for a variety of different types of objects, as compared to the other generative image models 128. Accordingly, the background generation module 112 stores (e.g., in a database) an indication of the particular generative image model 128*a* associated with an indication that the particular generative image model 128*a* is to be leveraged for background generation for input images 116 depicting objects 118 of object classes that have not yet been evaluated.

Referring now to FIG. 5, which depicts a user interface of a client device 104 for leveraging the background generation module 112 to produce a generated image 124 in accordance with the described techniques. In one or more implementations, a user of the client device 104 provides input specifying an input image 116 depicting a shoe (e.g., the object 118), and a background generation prompt 122. Additionally or alternatively, the user interface includes a user interface element (not depicted), via which a user provides input to specify the hallucination threshold 206. In response to a selection of the user interface element 502, the client device 104 communicates the input image 116, the background generation prompt 122, and/or the hallucination threshold 206 to the service provider system 102 over the network 106, as shown.

In the example 500, the background generation module 112 leverages an object classification model 504, which is a machine learning model that is pre-trained to classify objects 118 depicted in images. Any one of a variety of public or proprietary pre-trained object classification models 504 are employable by the background generation module 112 without departing from the spirit or scope of the described techniques. Examples of the object classification model 504 include, but are not limited to, AlexNet models, VGGNet (e.g., VGG-16 and VGG-19) models, GoogLeNet models, ResNet models, DenseNet models, and so on. In accordance with the described techniques, the object classification model 504 receives the input image 116 as input, and outputs an object class 506 of the object 118 depicted in the input image 116. In the illustrated example 500, the object class 506 is shoes.

The object class 506 is provided as input to a model selection module 508, which is configured to select a particular generative image model 128*a* based on the object class 506. By way of example, the model selection module 508 accesses the database, and determines that the particular generative image model 128*a* is to be leveraged for replacing backgrounds of images depicting shoes, e.g., the object class 506. Accordingly, the model selection module 508 selects the particular generative image model 128*a* to produce the generated image 124. Additionally or alternatively, the model selection module 508 accesses the database, and determines that there are no associations in the database between shoes (e.g., the object class 506) and the generative image models 128. Accordingly, the model selection module 508 selects the generative image model 128*a* that is leveraged for unevaluated object classes to produce the generated image 124.

In one or more implementations, the background generation module 112 iteratively produces generated images 124 using the selected generative image model 128*a* until a generated image 124 is produced that satisfies the hallucination threshold 206 specified by the user, as further discussed above with reference to FIG. 2. Once a generated image 124 satisfies the hallucination threshold 206, the service provider system 102 communicates, over the network 106, the generated image 124 and the hallucination metric 132 associated therewith to the client device 104. In response, the client device 104 displays the generated image 124 and the hallucination metric 132, as shown. If the user is still not satisfied with the generated image 124, the user is able to instruct the background generation module 112 produce a new generated image 124 via selection of the user interface element 502. Before doing so, the user of the client device 104 may provide input updating the background generation prompt 122.

Hallucination Metric-Driven Generative Image Model Training

Figure 8:
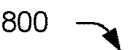
FIG. 8 depicts an example in which a client device leverages a model testing module to test improvement of a generative image model at reducing hallucinations in generated images periodically during training.

FIG. 6 depicts a system 600 in an example implementation showing operation of a background generation module to test improvement of a generative image model at reducing hallucinations in generated images periodically during training. FIG. 7 depicts a system 700 in an example implementation showing operation of a training module to train a generative image model to reduce hallucinations in generated images. FIG. 8 depicts an example 800 in which a client device leverages a model testing module to test improvement of a generative image model at reducing hallucinations in generated images periodically during training. In the following discussion, reference will be made to FIGS. 6-8 in parallel with procedure 1100 of FIG. 11.

Referring to FIG. 6, a training module 602 is configured to train a generative image model 128 to reduce amounts of deformation (e.g., hallucinations) introduced into objects depicted in images generated during background replacement (block 1102). Any one of a variety of machine learning techniques are usable by the training module 602 to train and/or refine the generative image model 128, including but not limited to, supervised learning techniques, unsupervised learning techniques, reinforcement learning techniques, semi-supervised learning techniques, self-supervised learning techniques, transfer learning techniques, ensemble learning techniques, multi-instance learning techniques, online learning techniques, and adversarial techniques.

Referring now to FIG. 7, which depicts an example supervised learning technique implemented by the training module 602. During training, the generative image model 128 receives training data 702 including a plurality of training images 704 and a plurality of background generation prompts 122. As shown, the training images 704 each depict an object 118 and have an original background 706.

In one training iteration, one of the training images 704 and one of the background generation prompts 122 are provided as input to the background generation module 112. It should be noted that in different training iterations, different ones of the training images 704 are paired with different ones of the background generation prompts 122. For example, processing one epoch during the training process includes pairing each training image 704 in the training data 702 with each background generation prompt 122, and performing a training iteration on each of the training pairs. By doing so, the described techniques enlarge the amount of training data, which improves training efficiency by increasing generalizability, reducing instances of overfitting, and improving robustness of the generative image model 128.

As shown, the background generation module 112 produces a generated image 124 depicting the object 118 and having a new background 708, and also determines a hallucination metric 132 for the generated image 124 in accordance with the described techniques. The hallucination metric 132 is provided as input to the training module 602, which computes a loss 710 based on the hallucination metric 132. In variations, the loss 710 corresponds to the hallucination metric 132 or the hallucination metric 132 is one term of multiple terms of a loss function. After the loss 710 is computed, the training module 602 adjusts parameters of the generative image model 128 to minimize the loss 710. The parameters are iteratively adjusted in different training iterations, e.g., on different pairs of training images 704 and background generation prompts 122. In sum, the training module 602 uses supervised learning based on the hallucination metric 132 to refine the generative image model 128 to reduce amounts of deformation (e.g., hallucinations) introduced into objects 118 of generated images 124 during background replacement.

Returning to FIG. 6, a model testing module 604 is configured to leverage the background generation module 112 to test, at predefined intervals 606 during training, improvement of the generative image model 128 at reducing the amounts of deformation (e.g., hallucinations) (block 1104). In one or more implementations, the predefined intervals 606 are time-based, e.g., the generative image model 128 is tested every minute, every thirty minutes, every hour, every two hours, etc. Additionally or alternatively, the predefined intervals 606 are based on an amount of data processed, e.g., the generative image model 128 is tested after every n number of training iterations, after each epoch is processed, etc.

As part of the testing process, the generative image model 128 receives testing pairs 608 including background generation prompts 122 paired with corresponding input images 116 depicting objects 118 and having first backgrounds. Before the training module 602 begins refining the generative image model 128, the unrefined generative image model 128 is employed to produce generated images 124 by replacing the first backgrounds with second backgrounds. Further, the background generation module 112 determines a hallucination metric 132 for each generated image 124 produced by the unrefined generative image model 128, resulting in a set of baseline hallucination metrics 610.

After a predefined interval 606, the background generation module 112 receives an updated generative image model 128 that has been updated (e.g., refined) by the training module 602 during the predefined interval 606 (and optionally one or more previous predefined intervals 606). In accordance with the previously described techniques, the background generation module 112 is employed to determine hallucination metrics 132 for generated images 124 produced by the updated generative image model 128 based on the testing pairs 608.

To do so, the updated generative image model 128 receives the testing pairs 608 including the background generation prompts 122 paired with the multiple input images 116 depicting the objects 118 and having the first backgrounds (block 1106). In accordance with the described techniques, the updated generative image model 128 generates multiple generated images 124 depicting the objects by replacing the first backgrounds with second backgrounds (block 1108). Furthermore, the salient object detection model 130 generates object mask pairs 406 in accordance with the described techniques, e.g., such that each object mask pair 406 includes a first object mask 202 of an object 118 within an input image 116 of a testing pair 608 and a second object mask 204 of the object 118 within a corresponding generated image 124 of the testing pair 608 (block 1110). Moreover, the hallucination metric determination module 134 determines, for each object mask pair 406, a hallucination metric 132 based on a comparison of the first object mask 202 and the second object mask (block 1112).

As shown, the hallucination metrics 132 are provided as input to an improvement determination module 612. Broadly, the improvement determination module 612 is configured to output a degree of improvement 614 of the updated generative image model 128 based on the hallucination metrics 132 determined for the object mask pairs 406 (block 1114) after the predefined interval 606. For example, the improvement determination module 612 determines an average hallucination metric 132 determined for the generated images 124 produced by the updated generative image model 128, and an average of the baseline hallucination metrics 610. In at least one example, the improvement determination module 612 determines the degree of improvement 614 as a percentage decrease of the average hallucination metric 132 relative to the average of the baseline hallucination metrics 610. In one or more implementations, the improvement determination module 612 outputs, e.g., for display at the client device 104 the degree of improvement 614.

Furthermore, the model testing module 604 compares the degree of improvement 614 to an improvement threshold 616. If the degree of improvement 614 falls below the improvement threshold 616, the model testing module 604 generates a first output 618 that includes communicating an instruction to continue training 620 to the training module 602. For example, the instruction causes the training module 602 to continue training the generative image model 128 during a subsequent predefined interval 606. Then, the generative image model 128 is again tested by the model testing module 604 after the subsequent predefined interval 606 in accordance with the described techniques after having been further updated by the training module 602.

If, however, the degree of improvement 614 meets the improvement threshold 616, the model testing module 604 generates a second output 622 that includes an instruction to end training 624 to the training module 602. For example, the instruction causes the training module 602 to cease training the generative image model 128. In addition, the model testing module 604 outputs the trained generative image model 128. For example, the model testing module 604 stores the trained generative image model 128 in one or more data storage devices of the service provider system 102.

Referring now to FIG. 8, which depicts a user interface of a client device 104 for leveraging the training module 602 and the model testing module 604 to train, and test improvement of, a generative image model 128 with respect to reducing hallucinations in generated images 124. In one or more implementations, a user selects a generative image model 128 (e.g., from multiple different generative image models 128) via interaction with the user interface element 802. In addition, the user specifies an improvement threshold 616 via interaction with the user interface element 804.

Moreover, the user selects the user interface element 806, which is effective to communicate a training initiation instruction 808 to the service provider system 102 over the network 106. The training initiation instruction 808 instructs the training module 602 to begin training the selected generative image model 128 to reduce amounts of deformation (e.g., hallucinations) introduced into objects 118 depicted in images during background replacement. In various implementations, the training module 602 employs the techniques discussed above with reference to FIG. 7 to train the generative image model 128. However, it is to be appreciated that any suitable training technique is implementable by the training module 602 without departing from the spirit or scope of the described techniques. In one or more implementations, the training module 602 retrieves the training data 702 from a data storage device of the service provider system 102. Additionally or alternatively, the user provides (e.g., via user input to the client device 104) training images 704 and/or background generation prompts 122, which are communicated to the training module 602 to augment the stored training data 702 of the service provider system 102.

In addition, the training initiation instruction 808 instructs the model testing module 604 to test the selected generative image model 128 at the predefined intervals 606 while the model is being trained, in accordance with the techniques discussed above with reference to FIG. 6. In particular, the training initiation instruction 808 instructs the model testing module 604 to test the selected generative image model 128 until the model achieves a degree of improvement 614 that meets the specified improvement threshold 616, e.g., seventy-five percent. In one or more implementations, the model testing module 604 retrieves the testing pairs 608 from a data storage device of the service provider system 102. Additionally or alternatively, the user provides (e.g., via user input to the client device 104) input images 116 and/or background generation prompts 122, which are communicated to the training module 602 to augment the stored testing pairs 608 of the service provider system 102.

In accordance with the described techniques, the model testing module 604 outputs a degree of improvement 614 of the generative image model 128 after a predefined interval 606. In particular, the model testing module 604 communicates the degree of improvement 614 to the client device 104 over the network 106, and the client device 104 displays the degree of improvement 614, as shown at 810. Here, the degree of improvement 614 is fifteen percent, which falls below the improvement threshold 616. Accordingly, the model testing module 604 instructs the training module 602 to continue training the generative image model 128. At any point during the training process, the user interface element 812 is selectable to communicate an instruction to the service provider system 102, instructing the training module 602 to cease training the generative image model 128.

After a subsequent predefined interval 606 (not depicted), the degree of improvement 614 meets the improvement threshold 616. Accordingly, the model testing module 604 instructs the training module 602 to cease training the generative image model 128. In addition, the model testing module 604 communicates the degree of improvement 614 to the client device over the network 106, and the client device 104 displays the degree of improvement 614 along with an indication that the training process has ended. In one or more implementations, the service provider system 102 stores (e.g., in a data storage device) the trained generative image model 128. In this way, user(s) of the client device(s) 104, can access the trained generative image model 128 (e.g., over the network 106) to produce generated images 124 having reduced hallucinations. In one or more implementations, the trained generative image model 128 is accessed via interaction with the user interface of FIG. 5.

Example System and Device

FIG. 12 illustrates an example system 1200 that includes an example computing device 1202 that is representative of one or more computing systems and/or devices that implement the various techniques described herein. This is illustrated through inclusion of the background generation module 112. The computing device 1202 is configurable, for example, as a server of a service provider, a device associated with a client (e.g., a client device 104), an on-chip system, and/or any other suitable computing device or computing system.

The example computing device 1202 as illustrated includes a processing device 1204, one or more computer-readable media 1206, and one or more input/output (I/O) interfaces 1208 that are communicatively coupled, one to another. Although not shown, the computing device 1202 further includes a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing device 1204 is representative of functionality to perform one or more operations using hardware. Accordingly, the processing device 1204 is illustrated as including hardware element 1210 that is configurable as processors, functional blocks, and so forth. This includes implementation in hardware as an application specific integrated circuit or other logic device formed using one or more semiconductors. The hardware elements 1210 are not limited by the materials from which they are formed or the processing mechanisms employed therein. For example, processors are configurable as semiconductor(s) and/or transistors (e.g., electronic integrated circuits (ICs)). In such a context, processor-executable instructions are electronically executable instructions.

The computer-readable storage media 1206 is illustrated as including memory/storage 1212 that stores instructions that are executable to cause the processing device 1204 to perform operations. The memory/storage 1212 represents memory/storage capacity associated with one or more computer-readable media. The memory/storage 1212 includes volatile media (such as random access memory (RAM)) and/or nonvolatile media (such as read only memory (ROM), Flash memory, optical disks, magnetic disks, and so forth). The memory/storage 1212 includes fixed media (e.g., RAM, ROM, a fixed hard drive, and so on) as well as removable media (e.g., Flash memory, a removable hard drive, an optical disc, and so forth). The computer-readable media 1206 is configurable in a variety of other ways as further described below.

Input/output interface(s) 1208 are representative of functionality to allow a user to enter commands and information to computing device 1202, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., employing visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1202 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are configurable on a variety of commercial computing platforms having a variety of processors.

An implementation of the described modules and techniques is stored on or transmitted across some form of computer-readable media. The computer-readable media includes a variety of media that is accessed by the computing device 1202. By way of example, and not limitation, computer-readable media includes "computer-readable storage media" and "computer-readable signal media."

"Computer-readable storage media" refers to media and/or devices that enable persistent and/or non-transitory storage of information (e.g., instructions are stored thereon that are executable by a processing device) in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data.

Examples of computer-readable storage media include but are not limited to RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and are accessible by a computer.

"Computer-readable signal media" refers to a signal-bearing medium that is configured to transmit instructions to the hardware of the computing device 1202, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1210 and computer-readable media 1206 are representative of modules, programmable device logic and/or fixed device logic implemented in a hardware form that are employed in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also be employed to implement various techniques described herein. Accordingly, software, hardware, or executable modules are implemented as one or more instructions and/or logic embodied on some form of computer-readable storage media and/or by one or more hardware elements 1210. The computing device 1202 is configured to implement particular instructions and/or functions corresponding to the software and/or hardware modules. Accordingly, implementation of a module that is executable by the computing device 1202 as software is achieved at least partially in hardware, e.g., through use of computer-readable storage media and/or hardware elements 1210 of the processing device 1204. The instructions and/or functions are executable/operable by one or more articles of manufacture (for example, one or more computing devices 1202 and/or processing devices 1204) to implement techniques, modules, and examples described herein.

The techniques described herein are supported by various configurations of the computing device 1202 and are not limited to the specific examples of the techniques described herein. This functionality is also implementable all or in part through use of a distributed system, such as over a "cloud" 1214 via a platform 1216 as described below.

The cloud 1214 includes and/or is representative of a platform 1216 for resources 1218. The platform 1216 abstracts underlying functionality of hardware (e.g., servers) and software resources of the cloud 1214. The resources 1218 include applications and/or data that can be utilized while computer processing is executed on servers that are remote from the computing device 1202. Resources 1218 can also include services provided over the Internet and/or through a subscriber network, such as a cellular or Wi-Fi network.

The platform 1216 abstracts resources and functions to connect the computing device 1202 with other computing devices. The platform 1216 also serves to abstract scaling of resources to provide a corresponding level of scale to encountered demand for the resources 1218 that are implemented via the platform 1216. Accordingly, in an interconnected device embodiment, implementation of functionality described herein is distributable throughout the system 1200. For example, the functionality is implementable in part on the computing device 1202 as well as via the platform 1216 that abstracts the functionality of the cloud 1214.

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method, comprising:
    receiving, by a generative image model, an input image depicting an object and having a first background;
    generating, by the generative image model, a generated image depicting the object by replacing the first background with a second background;
    generating, by a salient object detection model, a first object mask defining a first positioning of the object within the input image, and a second object mask defining a second positioning of the object within the generated image;
    determining a hallucination metric capturing an amount of deformation introduced into the object by the generative image model based on a comparison of the first object mask and the second object mask; and
    outputting the generated image based on the hallucination metric meeting a threshold.

2. The method of claim 1, wherein the comparison is a symmetric difference between the first object mask and the second object mask, the symmetric difference defining a first number of pixels including pixels of the first object mask that are absent from the second object mask and pixels of the second object mask that are absent from the first object mask.

3. The method of claim 2, wherein the hallucination metric is determined based on a ratio of the first number of pixels to a second number of pixels in the first object mask.

4. The method of claim 2, wherein determining the hallucination metric includes generating, using an edge detection algorithm, an outline of the object depicted in the input image, wherein the hallucination metric is determined based on a ratio of the first number of pixels to a second number of pixels in the outline of the object.

5. The method of claim 1, wherein the comparison is an intersection over union between the first object mask and the second object mask.

6. The method of claim 1, further comprising:
    extracting, from the input image, the object as depicted in the input image based on the first object mask; and
    extracting, from the generated image, the object as depicted in the generated image based on the second object mask, wherein the hallucination metric is determined based on pixel-by-pixel comparisons of color values between the object as depicted in the input image and the object as depicted in the generated image.

7. The method of claim 1, further comprising training the generative image model to reduce amounts of deformation introduced into objects during background replacement based on the hallucination metric.

8. The method of claim 1, further comprising prompting the generative image model to generate a new generated image depicting the object by replacing the first background with a third background based on the hallucination metric falling below the threshold.

9. The method of claim 1, wherein determining the hallucination metric includes normalizing a number of hallucinated pixels in the generated image to the object as depicted in the input image.

10. A computing device, comprising:
    a processing device; and
    a computer-readable storage medium storing instructions that, responsive to execution by the processing device, causes the processing device to perform operations including:
        receiving, by multiple generative image models, an image set including multiple input images depicting objects and having first backgrounds;
        generating, by each of the multiple generative image models, a generated image set including multiple generated images depicting the objects by replacing the first backgrounds with second backgrounds;
        generating pairs of object masks using a salient object detection model, each pair of object masks including a first object mask of an object within an input image and a second object mask of the object within a corresponding generated image;
        determining, for each pair of object masks associated with each of the multiple generative image models, a hallucination metric based on a comparison of the first object mask and the second object mask; and
        selecting a particular generative image model for replacing backgrounds of subsequently received images based on hallucination metrics determined for the pairs of object masks associated with the multiple generative image models.

11. The computing device of claim 10, wherein the comparison is a symmetric difference between the first object mask and the second object mask, the symmetric difference defining a first number of pixels including pixels of the first object mask that are absent from the second object mask and pixels of the second object mask that are absent from the first object mask.

12. The computing device of claim 11, wherein determining the hallucination metric includes generating, using an edge detection algorithm, an outline of the object depicted in the input image, wherein the hallucination metric is determined based on a ratio of the first number of pixels to a second number of pixels in the outline of the object.

13. The computing device of claim 10, wherein the objects depicted in the multiple input images are of a particular object class, and the particular generative image model is selected for replacing the backgrounds of the subsequently received images depicting the objects of the particular object class.

14. The computing device of claim 13, the operations further including:

receiving an additional input image and a prompt to replace a background of the input image with a new background;

classifying, using an object classification model, an additional object depicted in the additional input image as within the particular object class; and generating a new image of the additional object by replacing the background of the additional input image with the new background using the particular generative image model based on the additional object being classified as within the particular object class.

15. One or more non-transitory computer-readable storage media storing instructions that, responsive to execution by a processing device, cause the processing device to perform operations including:

training a generative image model to reduce amounts of deformation introduced into objects depicted in images generated during background replacement; and during the training, testing improvement of the generative image model at reducing the amounts of deformation, including performing at predefined intervals:

receiving, by the generative image model, multiple input images depicting objects and having first backgrounds;

generating, by the generative image model, multiple generated images depicting the objects by replacing the first backgrounds with second backgrounds;

generating pairs of object masks using a salient object detection model, each pair of object masks including a first object mask of an object within an input image and a second object mask of the object within a corresponding generated image;

determining, for each pair of object masks, a hallucination metric based on a comparison of the first object mask to the second object mask; and outputting a degree of improvement of the generative image model based on hallucination metrics determined for the pairs of object masks.

16. The one or more non-transitory computer-readable storage media of claim 15, wherein the comparison is a complement of the first object mask with respect to the second object mask, the complement defining a first number of pixels of the second object mask that are absent from the first object mask.

17. The one or more non-transitory computer-readable storage media of claim 16, wherein the hallucination metric is determined based on a ratio of the first number of pixels to a second number of pixels in the first object mask.

18. The one or more non-transitory computer-readable storage media of claim 16, wherein determining the hallucination metric includes generating, by an edge detection algorithm, an outline of the object depicted in the input image, wherein the hallucination metric is determined based on a ratio of the first number of pixels to a second number of pixels in the outline of the object.

19. The one or more non-transitory computer-readable storage media of claim 15, further comprising ending the training and outputting a trained generative image model based on the hallucination metrics determined for the pairs of object masks meeting a threshold during a predefined interval.

20. The one or more non-transitory computer-readable storage media of claim 15, wherein outputting the degree of improvement includes:

performing the testing of the improvement of the generative image model using the multiple input images before beginning the training, resulting in baseline hallucination metrics associated with the generative image model; and comparing the baseline hallucination metrics to the hallucination metrics determined for the pairs of object masks during a respective predefined interval.

* * * * *